United States Patent [19]
Meiller

[11] 4,158,160
[45] Jun. 12, 1979

[54] DRIVER'S SEAT WITH AUTOMATIC WEIGHT ADJUSTMENT

[75] Inventor: Hermann Meiller, Amberg, Fed. Rep. of Germany

[73] Assignee: Willibald Grammer, Fed. Rep. of Germany

[21] Appl. No.: 848,120

[22] Filed: Nov. 3, 1977

[30] Foreign Application Priority Data

Aug. 11, 1977 [DE] Fed. Rep. of Germany ....... 2736242

[51] Int. Cl.² ............................................. H02P 2/00
[52] U.S. Cl. .................................................... 318/467
[58] Field of Search ............ 307/10 R; 340/278, 272; 318/467, 626, 640, 653, 488, 482, 468, 466

[56] References Cited
U.S. PATENT DOCUMENTS

| | | | |
|---|---|---|---|
| 2,983,545 | 5/1961 | Garvey et al. | 318/467 |
| 3,236,033 | 6/1966 | Adams et al. | 318/467 |

Primary Examiner—David Smith, Jr.
Attorney, Agent, or Firm—Staas & Halsey

[57] ABSTRACT

A driver's seat is automatically adjustable for height in response to the weight of the person sitting in it. The seat is carried by a spring suspension which is displaceable by a reversible servo-motor. Scanning means for controlling the motor comprise an actuating member and two vertically spaced sensors, either the actuating member or the sensors being secured to the seat for movement therewith and the other being stationary. If the seat carries a lightweight person, the spring suspension permits it to descend to a position where the actuating member and the upper sensor co-operate to activate the servo-motor to displace the suspension for lowering the seat still further, whereas in the case of a heavy person the actuating member and the lower sensor are effective to raise the seat.

6 Claims, 3 Drawing Figures

DRIVER'S SEAT WITH AUTOMATIC WEIGHT ADJUSTMENT

The invention relates to a driver's seat with automatic weight adjustment, comprising a seat carrier mounted by means of a spring suspension, a reversible servo-motor for displacing the spring suspension to adjust the seating height, and scanning means which control the servo-motor and detect and determine the ideal or desired seating height with the aid of sensing means and an actuating member co-operating with the sensing means, the sensing means either being stationary and the actuating member being connected to the seat carrier for oscillation therewith or vice versa.

A driver's seat of this kind is for example described in DT-OS 2,123,399. In this driver's seat, the actuating member has a cam track provided with a groove substantially at the middle. The sensing means comprise a roller which rolls along the cam track and, when the roller arrives in the groove, break the circuit of the servo-motor. The driver's seat then provides the ideal seating height. Two limit switches associated with the maximum and minimum displacement of the spring suspension through which the seating height is varied ensure that the direction of the servo-motor is reversed. Thus, when a driver moves onto the seat and the servo-motor is switched on, the spring suspension is displaced until the seat carrier has the ideal seating height, i.e. until the roller running along the cam track reaches the recess. It can happen that the servo-motor initially turns in the wrong direction, this depending on which limit switch was the last to operate it. The servo-motor therefore displaces the seat carrier away from the ideal seating height until its direction is reversed by one of the limit switches and only then will the seat carrier travel towards the optimum seating height. Although the known driver's seat also provides for manual switches with which the direction of rotation can be set at the same time as the servo-motor is switched on, it is sometimes difficult for the driver to determine whether the seat has to be moved higher or lower when he has just moved onto the seat. This is because the feeling for an ideal seating height is generally experienced only after being seated for some time.

Independent of the weight adjustment, the entire driver's seat arrangement can additionally be manually adjusted for height. This seating height adjustment depends solely on the size of the driver whereas the automatic weight adjustment ensures that the seating height that is thus set is retained regardless of the weight of the driver.

Apart from the possibility of the servo-motor initially turning in the wrong direction, the driver's seat as just described also has the disadvantage that when the seat oscillates during driving the servo-motor will for example be switched on every time because the spring suspension of the seat carrier causes the roller to disengage the recess of the cam track. In this case the servo-motor may again be switched on in the wrong direction.

It is therefore an object of the present invention to construct a driver's seat of the aforementioned kind so that the servo-motor will always turn in the correct direction, i.e. always displace the seat carrier towards the ideal or desired seating height without being immediately switched on on the occurrence of slight deflections out of the ideal seating height, the setting to be effected automatically.

According to the invention, the sensing means comprise first and second sensors spaced apart by slightly more than the dimension of the actuating member, the first sensor being allocated to an excessively high seat setting and the second sensor being allocated to an excessively low seat setting, the servo-motor being operable by the first sensor in the sense of lowering the seating height when the actuating member reaches the detecting range of the first sensor and in the sense of raising the seating height when the actuating member reaches the detecting range of the second sensor.

When the driver sits on the seat carrier, the seat carrier will, depending on his weight, be spring-deflected either too much or too little and the actuating member will accordingly come into the detecting range of the second or the first sensor. Regardless of which detecting range the actuating member reaches, the spring suspension will be so displaced by the servo-motor that the seat carrier immediately approaches the ideal or desired seating height. Slight fluctuations in the seating height during travel remain out of consideration for as long as the actuating member has not reached the detecting range of one of the two sensors. Advantageously, the sensors and the actuating member are allowed to co-operate without contact and they are provided with large operating surfaces, the servo-motor being switched on when they overlap so as in particular to avoid wear.

Retarding means can ensure that, even with large fluctuations of the seating height during travel, activation of the servo-motor is prevented, this being advantageous for the driver's comfort and safeguarding the mechanical components.

According to a preferred embodiment, a second actuating member co-operates with a third sensor which responds on maximum displacement of the spring suspension in the sense of the highest seat position and can switch the servo-motor off when the second sensor associated with an excessively low seat setting responds simultaneously and by which the servo-motor can be switched on in the sense of lowering the seating height when the first sensor associated with an excessively high seat setting responds simultaneously. This first of all provides for overload protection. If an excessively heavy driver sits on the seat carrier, the servo-motor will displace the spring suspension to a maximum in the sense of raising the seat position without the actuating member leaving the detecting range of the sensor associated with an excessively low seat position. Automatic switching off in this condition prevents the servo-motor or the displacing mechanism from being damaged. If, however, in the case of a maximum displacement of the spring suspension in the sense of the highest seat position the actuating member is, in the loaded condition of the seat carrier, located in the detecting range of the sensor associated with an excessively high seat position, then it is desirable to displace the spring suspension in the sense of lowering the seat so as not to prevent starting of the servo-motor by the third sensor and the second actuating member provided for overload protection.

If, in a further form of the invention, the detecting range of the first sensor associated with an excessively high seat setting is determined so that, when the seat carrier is unloaded, the first actuating member is disposed beyond this detecting range, no subsequent regulation of the seating height will take place in the unloaded condition. Switching off therefore takes place automatically, i.e. one can dispense with a manually actuatable off switch.

However, it can happen that on excessive displacement of the spring suspension in the sense of the highest seat setting a lightweight person cannot deflect the seat carrier sufficiently downwardly by way of spring deflection so that the first actuating member will reach the detecting range of the first sensor associated with an excessively high seat setting and thus will not bring about the automatic weight adjustment. According to a further form of the invention, this can be prevented in that weak auxiliary spring means are provided between the seat carrier and the spring suspension and the first actuating member is arranged on the seat carrier itself. The auxiliary spring means are so dimensioned that their spring deflection is adequate even in the case of lightweight persons to bring the first actuating member into the detecting range of the first sensor.

The invention will now be described in more detail with reference to an example illustrated in the accompanying drawings, wherein.

Figure 1:
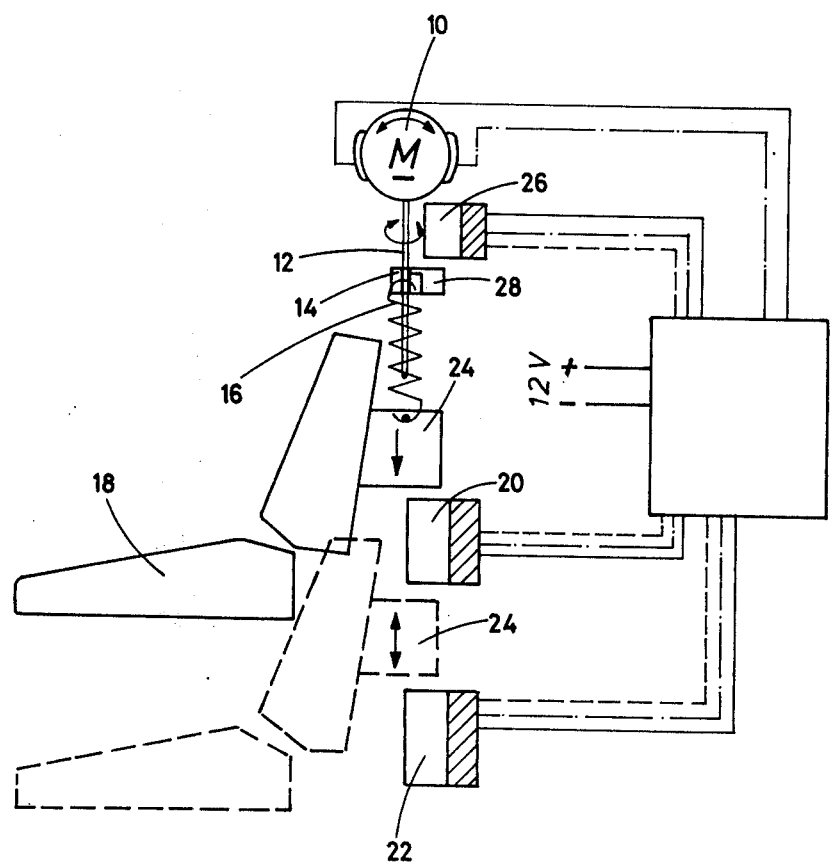
FIG. 1 is a diagrammatic side elevation of a driver's seat according to the invention.

FIG. 1 illustrates a servo-motor 10 which runs in both directions of rotation and turns a screw-threaded rod 12. On the screw-threaded rod there is a hanger 14 in the form of a nut for a coil spring 16. The hanger 14 is guided against rotation so that it is displaced axially together with the coil spring 16 upon rotation of the screw-threaded rod 12. A seat carrier 18 is secured to the lower end of the coil spring 16. The seat carrier is thus resiliently supported by means of the coil spring 16 serving as a spring suspension and can be adjusted in height by displacement of the coil spring 16.

Two sensors 20, 22 are stationary with respect to the seat carrier 18 and superposed at a spacing from one another. The spacing of the sensors 20 and 22 correspond substantially to the dimension of a first actuating member 24 provided on the seat carrier 18. If the first actuating member 24 is disposed between the two sensors 20 and 22, then the ideal or desired seating height has been reached. The two sensors 20, 22 are connected to the servo-motor 10 through an electronic control. The first sensor 20 associated with an excessively high seat position switches the servo-motor 10 on in the sense of lowering the height of the seat carrier 18 when the actuating member 24 partially overlaps the sensor 20. The second sensor 22 associated with an excessively low seat setting switches the servo-motor 10 on in the sense of raising the seat carrier 18 when the actuating member 24 partially or completely overlaps the second sensor 22. The actuating member 24 and the sensors 20, 22 may co-operate with one another by way of being inductively coupled.

A third sensor 26 is provided at the upper end of the displacement path of the hanger 14 for the coil spring 16, co-operates with a second actuating member 28 secured to the hanger 14 and serves as overload protection.

If the seat carrier 18 is now unloaded and assumes the position shown in full lines in FIG. 1, where the first actuating member 24 is located above the two sensors 20 and 22, the servo-motor is off. If, now, a lighter person is seated on the seat carrier 18, the coil spring 16 is stretched and the first actuating member 24 reaches the detecting range of the first sensor 20. The servo-motor is thereupon switched on and the screw-threaded rod 12 is turned so that the hanger 14 is displaced downwardly. The servo-motor 10 remains switched on until the actuating member 24 has moved out of the detecting range of the first sensor 20 and come to lie between the first sensor 20 and the second sensor 22. As soon as this ideal seating height has been reached, the servo-motor 10 is switched off. Switching on and off of the servo-motor in accordance with the position of the actuating member relatively to the sensors is in each case carried out with some delay so as to avoid unstable conditions and actuation of the electronic device on the occurrence of normal vibrations.

If, now, an excessively heavy person is seated on the seat carrier 18 so that the latter is deflected downwardly beyond the ideal seating height until the first actuating member 24 reaches the detecting range of the second sensor 22, the procedure as described above is repeated in the reverse direction, i.e. the seat carrier is lifted.

If the person raises himself from the seat carrier 18 after the ideal seating height has been set, the seat carrier 18 will, by reason of the coil spring 16, return to a position in which the actuating member 24 is disposed above the two sensors 20 and 22.

Now, in the case of very heavy persons it can happen that the hanger 14 for subsequently regulating the seating height has been led up to the limit of its upper displacement path but the seat carrier 18 is nevertheless located in a position that is too low. In this case, therefore, the first actuating member 24 is disposed in the detecting range of the second sensor 22 whilst the second actuating member 28 is located in the detecting range of the third sensor 26. The electronic control is now designed in such a way that in this condition no further subsequent regulation of the seating height takes place, i.e. the servo-motor 10 is switched off.

If, now, a lighter person is seated on the seat carrier 18 after the hanger 14 had travelled to its upper limit of displacement because of a heavy person, the second actuating member 28 now being located in the detecting range of the third sensor 26, then subsequent regulation of the seating height, namely downward movement of the hanger 14, is readily possible and is actuated in that the first actuating member 24 is now located in the detecting range of the first sensor 20.

Figure 2:
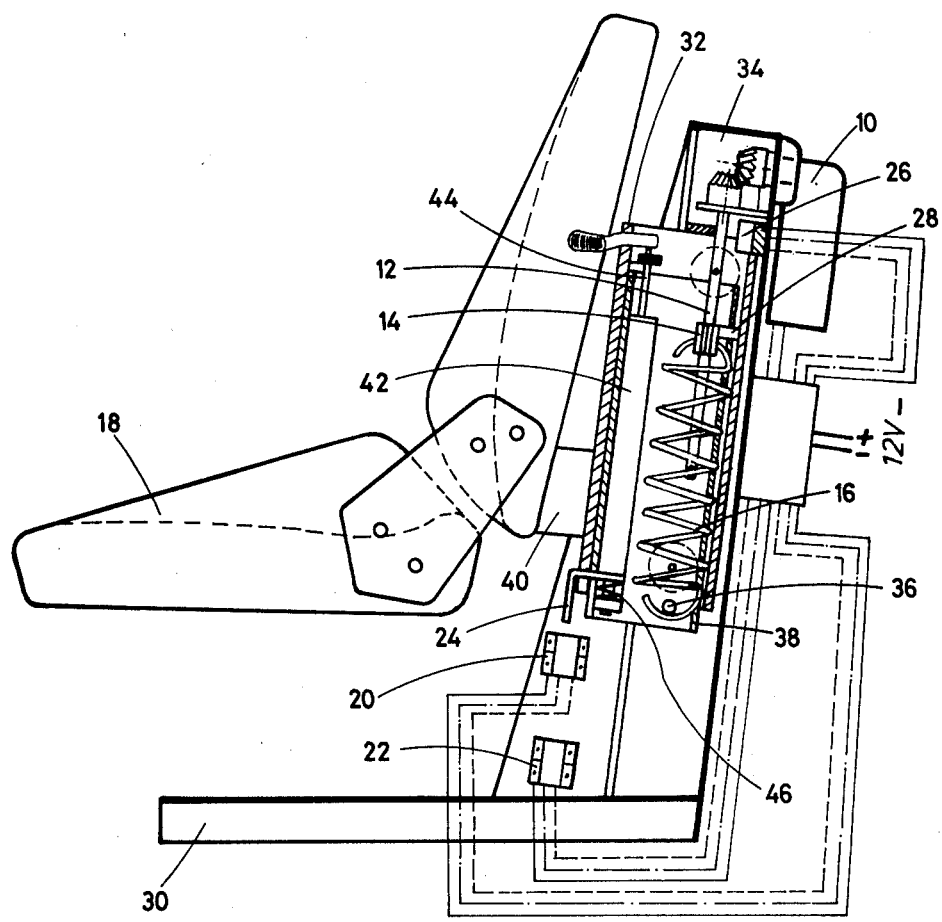
FIG. 2 is a side elevation of a practical embodiment of the seat.

FIG. 2 illustrates a preferred embodiment of the driver's seat according to the invention. Fixed to a base frame 30, which may itself be adjustable for height, there is a tubular carrier 32 provided with angular or bevel gearing 34 at its upper end. The bevel gearing 34 is driven by the servo-motor 10 secured to the base frame 30 and has as its output shaft the screw-threaded rod 12 which extends into the tubular carrier 32. The hanger 14 in the form of a nut is connected to the screw-threaded rod 12 against rotation but to permit axial displacement. It is secured to the upper end of a substantially vertically disposed coil spring 16 of which the lower end engages a pin 36 secured to an internal tube 38 that is displaceable within the tubular carrier 32. The coil spring 16 and screw-threaded rod 12 lie within the internal tube 38. The seat carrier 18 comprises an arm 40 which extends through slots (not shown) in the tubular carrier 32 and internal tube 38 and is secured to a sleeve 42 in the internal tube 38, which sleeve is displaceable along a bar 44 fixed in the internal tube 38. Between the lower end of the sleeve 42 and the lower end of the bar 44 there is an auxiliary spring 46 supported against an abutment of the bar 44 or the internal tube 38. Provided at the lower end of the sleeve 42 there is the actuating member 24 which extends outwardly and in the path of movement of which the sensors 20 and 22 are fixed to the base frame 30. The third sensor 26 is provided at the upper end of the tubular carrier and co-operates with the actuating member 28 on the hanger 14. In FIG. 2 the seat carrier 18 is shown in the unloaded condition. If a person now moves onto the seat carrier 18, the weak auxiliary spring 46 is first of all compressed whereby the sleeve 42 moves downwardly independently of the internal tube 38 before the internal tube 38 is carried along with it provided that the person is sufficiently heavy. The available deflection of the spring 46 is adequate to bring the actuating member 24 secured to the sleeve into the detecting range of the first sensor 22. It is therefore not necessary to load the coil spring 16 to such an extent that its deflection suffices to bring the actuating member 24 into the detecting range of the first sensor 20. The auxiliary spring 46 therefore ensures that the driver's seat according to the invention will function properly even in the case of particularly lightweight persons.

Figure 3:
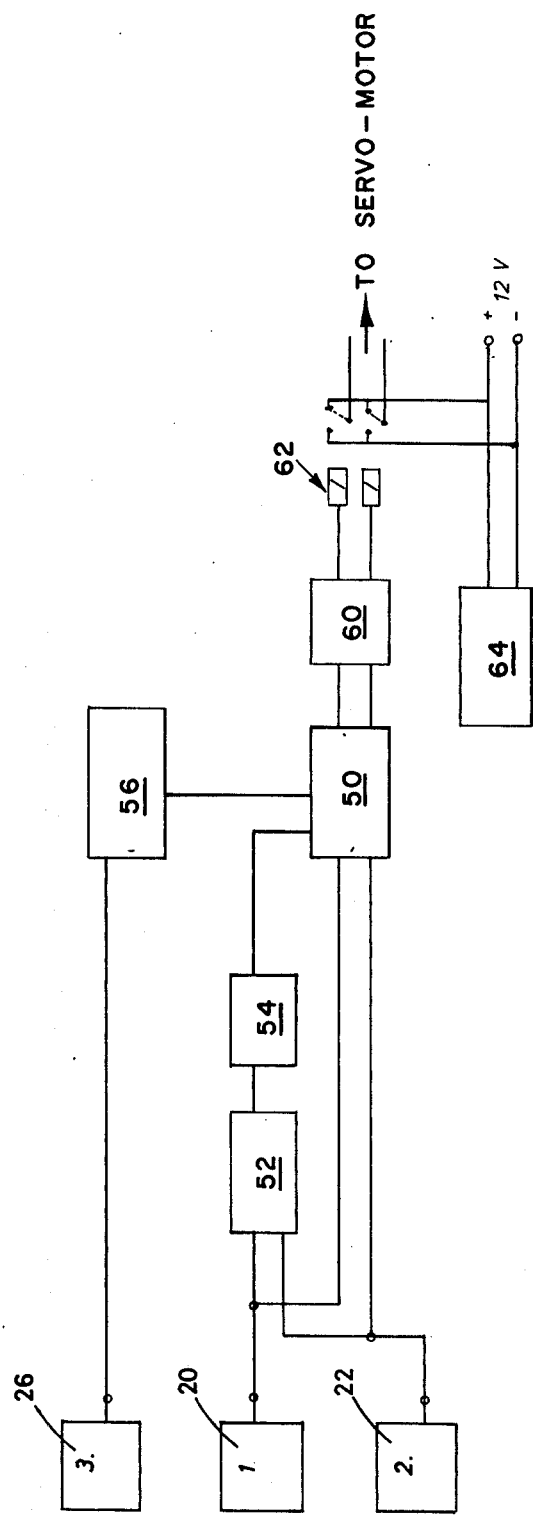
FIG. 3 is a circuit block diagram of the control for the driver's seat.

FIG. 3 gives an example of a circuit diagram for controlling the servo-motor. The sensors 20 and 22 are connected by a respective conduit to a switch logic 50 and in addition to an integrator 52 having a trigger circuit 54 connected to its output, the trigger circuit being in turn connected to the switch logic 50. Further, the third sensor 26 is connected to the switch logic 50 by way of a monitoring circuit 56. A relay drive 60 at the output of the switch logic actuates a switch relay 62 for reversing the servo-motor. A voltage stabilizer 64 ensures that the servo-motor is operated at a constant voltage.

If, now, the actuating member 24 is brought into the detecting range of the first sensor 20 or second sensor 22, the respective sensor will deliver an output signal directly to the switch logic and also indirectly by way of the integrator and the trigger circuit. The integrator retards the output signal. If, now, the retarded output signal as well as the direct output signal are simultaneously applied to the switch logic, the switch relay is actuated correspondingly. If, however, the direct output signal has already disappeared when the delayed output signal arrives at the switch logic, no actuation of the switch relay will take place and this ensures that, if the first actuating member 24 dips into the detecting range of one of the sensors 20, 22 for only a short period as a result of oscillations of the seat carrier during travel, no subsequent regulation of the seating height will take place, which would in any case be too sluggish and could bring about an unstable condition. Further, the switch logic ensures that operation of the switch relay by the sensor 22 is prevented if the sensor 26 responds simultaneously.

I claim:

1. A driver's seat with automatic weight adjustment, comprising a seat carrier mounted by means of a spring suspension, a reversible servo-motor for displacing the spring suspension to adjust the seating height, and scanning means which control the servo-motor and detect and determine the ideal or desired seating height with the aid of sensing means and an actuating member co-operating with the sensing means, the sensing means either being stationary and the actuating member being connected to the seat carrier for oscillation together therewith or vice versa, characterised in that the said sensing means comprise first and second sensors spaced apart by slightly more than the dimension of the said actuating member, the first sensor being allocated to an excessively high seat setting and the second sensor being allocated to an excessively low seat setting, and that the said servo-motor is operable by the first sensor in the sense of lowering the seating height when the said actuating member reaches the detecting range of the said first sensor and in the sense of raising the seating height when the said actuating member reaches the detecting range of the said second sensor.

2. The seat defined in claim 1, wherein the said sensors and the said actuating member co-operate without contact and have large operating surfaces to switch the servo-motor on when they overlap.

3. The seat defined in claim 1, wherein retarding means delaying switching on of the said servo-motor by the said two sensors and the said actuating member after a time delay are provided, the said servo-motor being operable only if the actuating member is still detectable by one of the said sensors after the said time delay.

4. The seat defined in claim 1, further including a second actuating element co-operating with a third sensor which responds on maximum displacement of said spring suspension in the sense of the highest seat position and can switch the servo-motor off when the said second sensor associated with an excessively low seat setting responds simultaneously and by which the said servo-motor can be switched on in the sense of lowering the seating height when the said first sensor associated with an excessively high seat setting responds simultaneously.

5. The seat defined in claim 1, wherein the detecting range of the said first sensor associated with an excessively high seat setting is determined so that, when the said seat carrier is unloaded, the said first actuating member is disposed above its detecting range.

6. The seat defined in claim 5, wherein weak auxiliary spring means are provided between the said seat carrier and the said spring suspension and wherein the said first actuating member is arranged on the said seat carrier itself.

* * * * *